(12) United States Patent
Hove

(10) Patent No.: US 11,906,106 B2
(45) Date of Patent: Feb. 20, 2024

(54) VALVE UNIT

(71) Applicant: DANHYDRA A/S, Herning (DK)

(72) Inventor: Thomas Hove, Herning (DK)

(73) Assignee: DANHYDRA A/S

( * ) Notice: Subject to any disclaimer, the term of this patent is extended or adjusted under 35 U.S.C. 154(b) by 382 days.

(21) Appl. No.: 17/292,484

(22) PCT Filed: Nov. 11, 2019

(86) PCT No.: PCT/EP2019/080855
§ 371 (c)(1),
(2) Date: May 10, 2021

(87) PCT Pub. No.: WO2020/099313
PCT Pub. Date: May 22, 2020

(65) Prior Publication Data
US 2022/0018496 A1    Jan. 20, 2022

(30) Foreign Application Priority Data
Nov. 14, 2018 (DK) .................................. 2018 00859

(51) Int. Cl.
*F16N 27/02* (2006.01)
*F16K 3/02* (2006.01)
*F16K 3/312* (2006.01)

(52) U.S. Cl.
CPC ............ *F16N 27/02* (2013.01); *F16K 3/0209* (2013.01); *F16K 3/312* (2013.01)

(58) Field of Classification Search
CPC .......... F16N 25/02; F16N 27/02; F16N 19/00; F16K 3/00; F16K 11/06; F16K 11/0655
(Continued)

(56) References Cited

U.S. PATENT DOCUMENTS 2,589,188 A * 3/1952 Edmond ............... F16K 31/088
251/340
2,646,071 A * 7/1953 Wagner ................. F16K 15/023
251/65
(Continued)

FOREIGN PATENT DOCUMENTS

CN    2 234 022 Y    8/1996
GB    2 044 410 A    10/1980
(Continued)

OTHER PUBLICATIONS

International Search Report, PCT/EP2019/080855, dated Feb. 17, 2020, 4 pages.
(Continued)

*Primary Examiner* — Henry Y Liu
(74) *Attorney, Agent, or Firm* — Ware, Fressola, Maguire & Barber LLP

(57) ABSTRACT

By mounting a line blind valve (2) between a grease container (1) and a grease lubrication pump (3) replacement and mounting of the grease container can take place without leak of grease during the mounting as the outlet section must turn downwards during the mounting. By providing the installation with a line blind valve this can block grease leakage during the mounting and thereafter be opened. The valve (2) includes a flat central part (10) with an opening (11) which part can be displaced in relation to an upper positioned inlet section (4) and a lower positioned outlet section (8) and by displacement of the slide open and close for passage. In order to keep these parts (4, 8, 10) together a magnet (6,7) is embedded in each of the two parts (4, 8) by which a sealed connection is secured with no air infiltration and metal particles held back.

4 Claims, 2 Drawing Sheets

(58) Field of Classification Search
USPC .................................................. 184/80, 82
See application file for complete search history.

(56) References Cited

U.S. PATENT DOCUMENTS

| | | | | |
|---|---|---|---|---|
| 2,949,931 | A * | 8/1960 | Ruppright | F16K 15/02 137/533.19 |
| 3,495,620 | A * | 2/1970 | Seymour | F16K 31/08 604/9 |
| 3,995,661 | A * | 12/1976 | Van Fossen | F16K 31/08 137/13 |
| 4,865,588 | A * | 9/1989 | Flinchbaugh | A61F 5/441 604/129 |
| 9,845,898 | B1 * | 12/2017 | Johnson | F16K 17/02 |
| 10,711,901 | B2 * | 7/2020 | Haddad | F16K 3/18 |
| 2008/0271501 | A1 * | 11/2008 | Roder | F16K 1/2057 70/175 |
| 2013/0263649 | A1 * | 10/2013 | Storch | F16K 25/005 251/366 |
| 2018/0100589 | A1 * | 4/2018 | Haddad | F16K 3/18 |
| 2019/0346058 | A1 * | 11/2019 | Murison | F04B 17/03 |

FOREIGN PATENT DOCUMENTS

| | | |
|---|---|---|
| JP | S60 18670 A | 1/1985 |
| JP | S60 159500 A | 8/1985 |

OTHER PUBLICATIONS

Written Opinion of the International Searching Authority, PCT/EP2019/080855, dated Feb. 19, 2020, 6 pages.

* cited by examiner

VALVE UNIT

BACKGROUND OF THE INVENTION

Grease lubrication installations of this kind are to a large extent used for lubrication of bearings and the like where securing of stable lubrication is required without the need for any further service other than securing an adequate quantity of grease.

The grease can be stored in a grease container which might be flexible and from which the grease can be sucked for the purpose of pumping out via pipes, hoses and the like for each location of lubrication.

During replacement of such a grease container a problem may arise when the grease container is demounted and mounted to the pump, as the outlet of the container during mounting must be turned downwards in order to be mounted to the pump.

In practice this means that grease can escape from the container during the mounting, which is inconvenient to the operator and inconvenient due to the subsequent cleaning, and furthermore, causing unnecessary waste of grease.

SUMMARY OF THE INVENTION

The objective of the invention is to remedy these disadvantages and inconveniences which, according to the invention, are remedied by means of a line blind valve which comprises a slide provided with an opening which slide and thereby opening can be displaced in relation to the passage in the inlet- and outlet sections for closing and opening for passage of the grease, respectively. The invention relates to a valve unit such as a line blind valve in particular for use in a grease lubrication installation which valve unit (2) may be mounted between a grease container (1) and a pump and where the valve unit (2) comprises:
- an inlet section (4) comprising a through-going passage (9) and means (5) for mounting the grease container (1); and
- an outlet section (8) with means for connection or mounting to the pump, wherein the valve unit (2) comprises a slide (10) comprising an opening (11) which slide (10) and thereby opening (11) can be displaced relative to the passage (9) of the inlet section (4) and the outlet section (8) thereby closing or opening for passage of the grease, respectively. Normally, the opening (11) may correspond in shape and size to the passage (9) through the inlet section (4).

In this way, the inlet section of the installation can be mounted on the grease container in a position where its outlet is turned upward and with the valve in its closed position whereafter the container can be turned and mounted to the pump without risk of grease waste whereafter the valve can be opened. Thus, a grease container can be replaced and mounted to a pump without the leaking of grease, while securing that there is no infiltration of air into the grease as there is no entry for the air.

By embedding magnets, as described below, in both the inlet and the outlet sections, these sections will be pulled towards each other and thereby about the upper and lower side of the slide. Thereby it is secured that the grease will remain in the passage and that the grease will be scraped off in the passage during the displacement of the slide.

By shaping the magnets as ring magnets, as described below, an even distribution of pull and thereby pressure for securing tightness is achieved, so that the grease will remain inside the passage and air is prevented from being sucked in.

By providing the slide with an outer border, as described below, the movement of the slide will be restricted to an open or to a closed position.

Finally, it is appropriate to use the valve as a barrier, as described below, during the mounting of the grease container, and the magnets will secure that potential metal particles are held back and thereby keep the grease clean.

BRIEF DESCRIPTION OF THE DRAWINGS

An example of a preferred embodiment according to the invention will be described in detail in the following with reference to the drawings, where.

DESCRIPTION OF THE EXAMPLE OF AN EMBODIMENT

Figure 1:
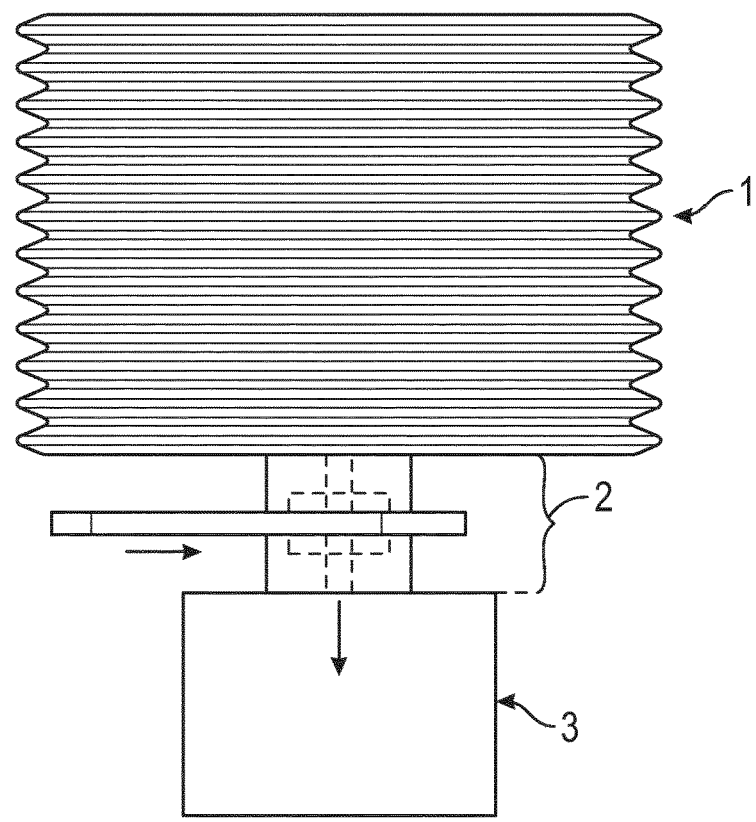
FIG. 1 shows an installation comprising a grease container, a valve unit and a pump.

An embodiment of a grease lubrication installation is shown in FIG. 1. It consists of a grease container 1 which in the shown example has a flexible side wall, a valve unit 2 and a pump 3.

In general, that a container has a flexible side wall indicates that the side walls of the container 1 may adapt to an internal volume of the container 1 by extending in one or more direction(s) during filling and by reducing size in one or more direction(s) during emptying. The flexibility may e.g. be due to that the material constituting the container is elastic or it may be due to that the material constituting one or more walls of the container is shaped e.g. folded in a way which allows the walls to extend in one or more direction(s). According to the embodiment of FIG. 1, the flexibility is provided by shaping the walls in the longitudinal direction with a pleating.

The valve unit 2 comprises fastening means, e.g. corresponding to fastening means on the outlet end of a grease container 1, which fastening means or corresponding fastening means provides a fluid tight mounting between the outlet end of a grease container 1 and the valve unit 2. According to the embodiment of FIG. 1, the grease container 1 is at the outlet end configured with a threaded connecting piece which can be screwed together with an inlet section 4 of the valve unit 2, as will be explained later.

Figure 2:
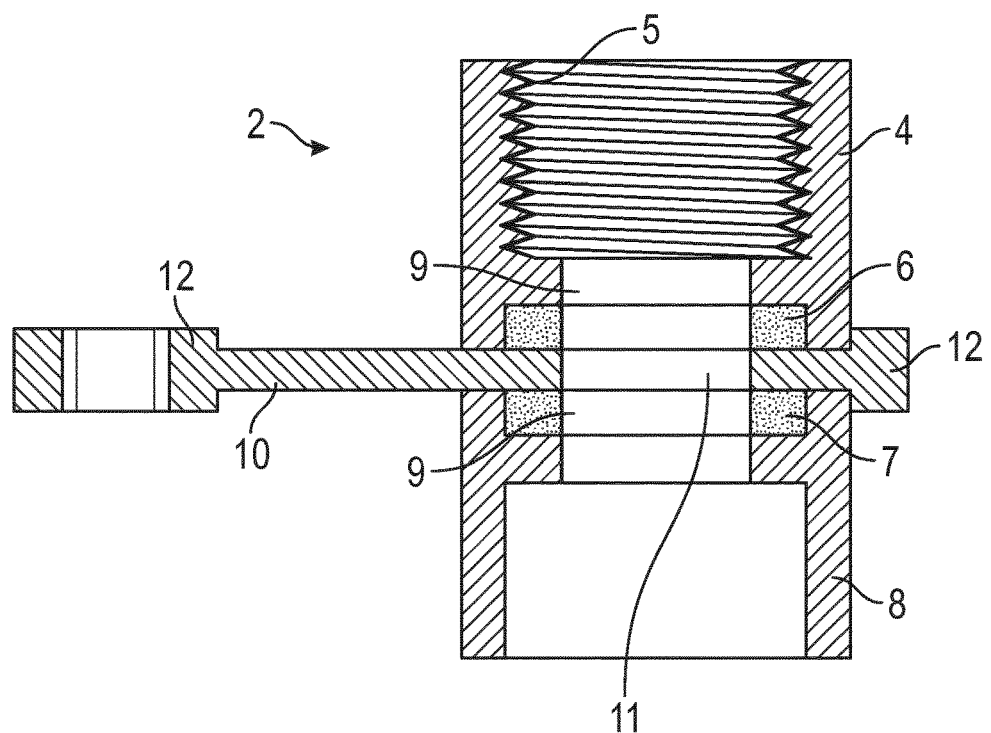
FIG. 2 shows a cut-through view of a valve unit in an open position allowing flow between the inlet and outlet section.
Figure 3:
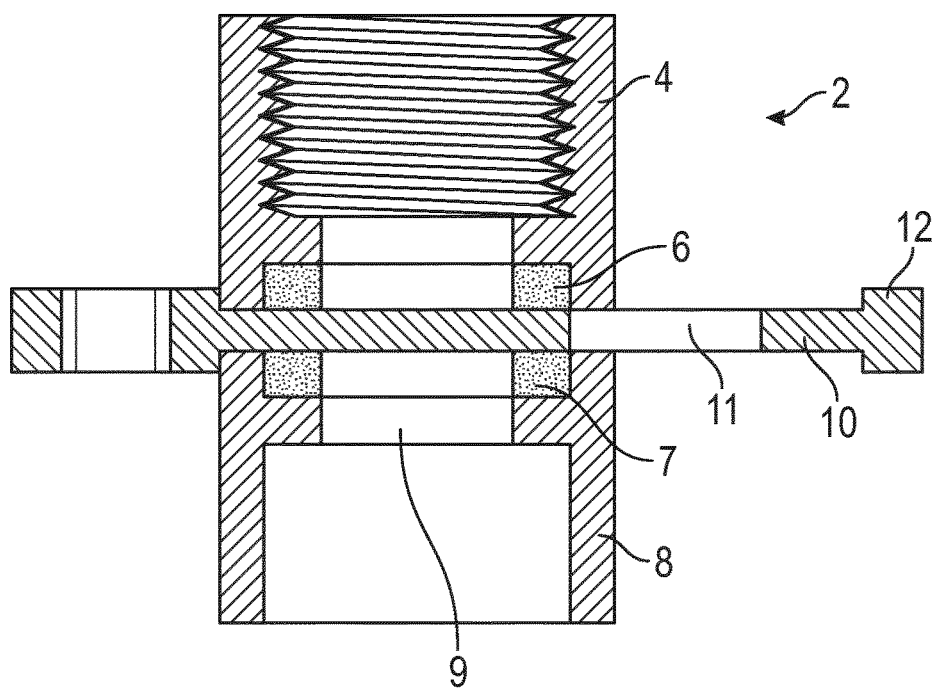
FIG. 3 shows a cut-through view of a valve unit in a closed position.

FIGS. 2 and 3 show an embodiment of a valve unit 2 according to the invention in an open and closed position respectively. The valve unit 2 comprises an inlet section 4 which inlet section 4 may comprise the fastening means corresponding to fastening means or surfaces on a grease container outlet and an outlet sections 8 comprising fastening means corresponding to fastening means or surfaces on a pump or pump inlet, and a valve or slide 10. In the figures, the outlet section 8 extends below the slide 10.

The inlet section 4 has a through-going passage 9 which can be closed off by the valve or slide 10. According to the shown embodiment, the valve or slide 10 is a line blind valve comprising a slide 10 which may slide between two positions, an open position where an opening 11 in the slide 10 corresponds to the through-going opening 9 of the inlet section 4 and a closed position where the opening 11 has no common area with the through-going opening 9 of the inlet section 4. At one side of the valve 10, e.g. below the valve or slide 10, is the outlet section 8 mountable to the suction side of a grease pump 3.

In the shown embodiment, the inlet section 4 comprises a passage 9 which passage may comprise fastening means e.g. in form of an inner thread 5 at the top which will allow the inlet section 4 of the valve unit 2 to be fastened fluid tight e.g. by being screwed to the outlet connection piece of the grease container 1.

Figure 4:
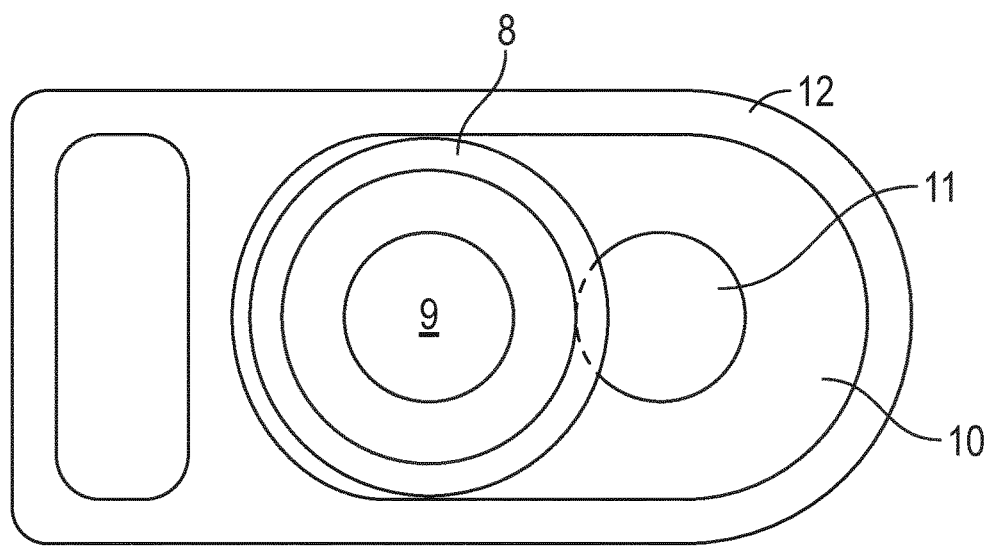
FIG. 4 shows the valve unit including the outlet section and the slide seen from below.

Below or downstream of the inlet section 4, a flat or plate shaped slide 10 is positioned, an example of a flat slide 10 is shown in FIG. 4 seen from below or from the outlet end.

In general, a slide 10 may comprise a flat part comprising a through opening 11 corresponding to the passage 9 through the inlet section 4 and/or of the outlet section 8.

At the side along the edge of the flat part of the slide 10 there may be a raised border 12 on one or both sides, the purpose of which is to limit the movement of the slide between an open position FIG. 2 and a closed position FIG. 3.

For operation of the slide, the slide may be provided with a finger grip at one or both end(s).

For keeping the two sections 4 and 8 together around the slide 10 a magnet 6 and 7 may be embedded in each section 4 and 8. The magnets in the shown example are ring magnets.

By means of these magnets a permanent fixation of the sections 4 and 8 to each other is achieved simultaneously with securing the displacement of the slide 10.

Further, the fixation assists in a completely sealed passage for the grease which is under a certain pumping pressure drop.

The fixation of the parts also causes the grease to be scraped off the slide and remain inside the opening 11 and further prevents that air can be sucked into the grease.

Finally, the magnets 6 and 7 secure that potential metal particles in the grease are being held back by the magnets such that the grease remains free from potential metal particles.

The valve with its inlet and outlet sections is advantageously used in grease lubrication installations where grease containers are used which need to be replaced as they are being emptied.

Till now this is only possible with the outlet of the grease container turned downwards which has been disadvantageous in relation to leak of grease. By means of the valve, according to the invention, the inlet section 4 can be screwed to the outlet thread of the grease container with this in upright position and with the slide 10 in its closed position, as shown in FIG. 3.

Hereafter the container 1 can be turned and mounted to the suction connector of the pump 3.

By this a mounting completely waste free is secured and also no infiltration of air to the grease is secured as the abutment to the surface of the slide is airtight.

When the container is empty the valve can be closed again, and the container can be demounted in an upright position and grease will not escape.

The invention claimed is:

1. A valve unit for use in a grease lubrication installation which valve unit (2) is mountable between a grease container (1) and a pump and where the valve unit (2) comprises:
    an inlet section (4) comprising a through-going passage (9) and means (5) for mounting the grease container (1); and
    an outlet section (8) for connection or mounting to the pump, wherein the valve unit (2) comprises a slide (10) comprising an opening (11), wherein the slide (10) and thereby the opening (11) is displaceable relative to the passage (9) of the inlet section (4) and the outlet section (8) thereby closing or opening for passage of the grease, respectively, wherein at least one inlet section magnet (6) is embedded in the inlet section (4) and at least one outlet section magnet (7) is embedded in the outlet section (8), and wherein the inlet section magnet abuts an inlet side of the slide (10) and the outlet section magnet (8) abuts an outlet side of the slide (10).

2. A valve unit according to claim 1, wherein the at least one inlet section magnet (6) and the at least one outlet section magnet (7) are ring-shaped comprising an opening equivalent to the passage (9) of the inlet section (4) and the outlet section (8) comprising the through-going passage (9).

3. A valve unit according to claim 1, wherein a plane part of the slide (10) is provided with a border (12) along an edge for limiting displacement of the slide (10).

4. Method of using a valve unit according to claim 1, comprising blocking leak of grease from the grease container (1) during connection of the grease container to the pump (3) followed by opening for full passage of grease to the pump (3) and holding back potential metal particles in the grease.

\* \* \* \* \*